(12) United States Patent
Good

(10) Patent No.: US 11,727,640 B1
(45) Date of Patent: Aug. 15, 2023

(54) SYSTEMS AND METHODS FOR THE CONTINUOUS PRESENTATION OF POINT CLOUDS

(71) Applicant: Illuscio, Inc., Culver City, CA (US)

(72) Inventor: Max Good, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/064,592

(22) Filed: Dec. 12, 2022

(51) Int. Cl.
  *G06T 17/20* (2006.01)
  *G06T 7/246* (2017.01)
  *G06T 7/73* (2017.01)
  *G06T 15/30* (2011.01)

(52) U.S. Cl.
  CPC ............ *G06T 17/205* (2013.01); *G06T 7/251* (2017.01); *G06T 7/75* (2017.01); *G06T 15/30* (2013.01)

(58) Field of Classification Search
  None
  See application file for complete search history.

(56) References Cited

U.S. PATENT DOCUMENTS

| | | | | |
|---|---|---|---|---|
| 2012/0038640 A1* | 2/2012 | Lee | ................... | G06T 17/005 345/420 |
| 2014/0198097 A1* | 7/2014 | Evans | ................... | G06T 17/00 345/419 |
| 2021/0407169 A1* | 12/2021 | Swann | ................ | A63F 13/5258 |

OTHER PUBLICATIONS

"Leica Cyclone Basic User Manual", C.R. Kennedy & Company, Sep. 2017, 91 pages.

\* cited by examiner

*Primary Examiner* — James A Thompson
(74) *Attorney, Agent, or Firm* — Ansari Katiraei LLP; Arman Katiraei; Sadiq Ansari

(57) ABSTRACT

A graphics system and associated methods produce a continuous presentation and/or visualization from a point cloud with a distributed and disconnected set of data points that otherwise produce a discontinuous presentation and/or visualization of a scene. The graphics system receives the data points, and expands a polygonal mesh from the position of each particular data point such that each side of the polygonal mesh connects to a side of a polygonal mesh that is expanded from the position of each data point of a set of data points that neighbors the particular data point. The polygonal mesh of the particular data point spans a larger area or volume of the space than the particular data point. The graphics system produces the continuous visualization of the scene from rendering the polygonal mesh that is expanded from the position of each particular data point instead of rendering the data points.

20 Claims, 11 Drawing Sheets

SYSTEMS AND METHODS FOR THE CONTINUOUS PRESENTATION OF POINT CLOUDS

BACKGROUND

A point cloud is a three-dimensional ("3D") model or representation of a scene. The point cloud includes data points that are distributed in a 3D space to represent the position and descriptive characteristics of surfaces or objects in the scene. The data points are disconnected and are separated from neighboring data points by a distance. The data point separation is due to the resolution or fidelity of the scanner used in scanning the scene and generating the data points to represent the scene.

From afar, the point cloud produces a high resolution visualization that accurately captures the exact positioning and coloring of the scanned surfaces or objects of the scene. However, as one zooms into the point cloud visualization, the gaps between the data points become more and more noticeable. Moreover, as one rotates or views the point cloud visualization from different angles or perspectives, gaps corresponding to surfaces and/or objects that were not fully exposed to the scanner and that are not adequately represented by a dense set of data points become more and more noticeable.

DETAILED DESCRIPTION OF PREFERRED EMBODIMENTS

The following detailed description refers to the accompanying drawings. The same reference numbers in different drawings may identify the same or similar elements.

Provided are systems and methods for the continuous presentation of point clouds and/or a distributed and disconnected set of data points that produce three-dimensional ("3D") representation of a scene. The continuous presentation involves dynamically changing the size, shape, and/or form of the distributed and disconnected data points from a point cloud to present the scene with continuous and/or connected surfaces.

A graphics system generates the continuous presentation for a point cloud or the point cloud data points by dynamically expanding a polygon or mesh from each data point with a custom size, shape, and/or form that is centered on the data point position and that is determined based on the positions and surface normals of neighboring data points. The polygons or meshes are expanded to a maximum size or until the edges of polygons or meshes expanded from neighboring data points connect, thereby creating a continuous surface and eliminating visible gaps between the data points. Each polygon or mesh inherits the color and/or other descriptive characteristics of the data point that the polygon or mesh is centered on.

Figure 1:
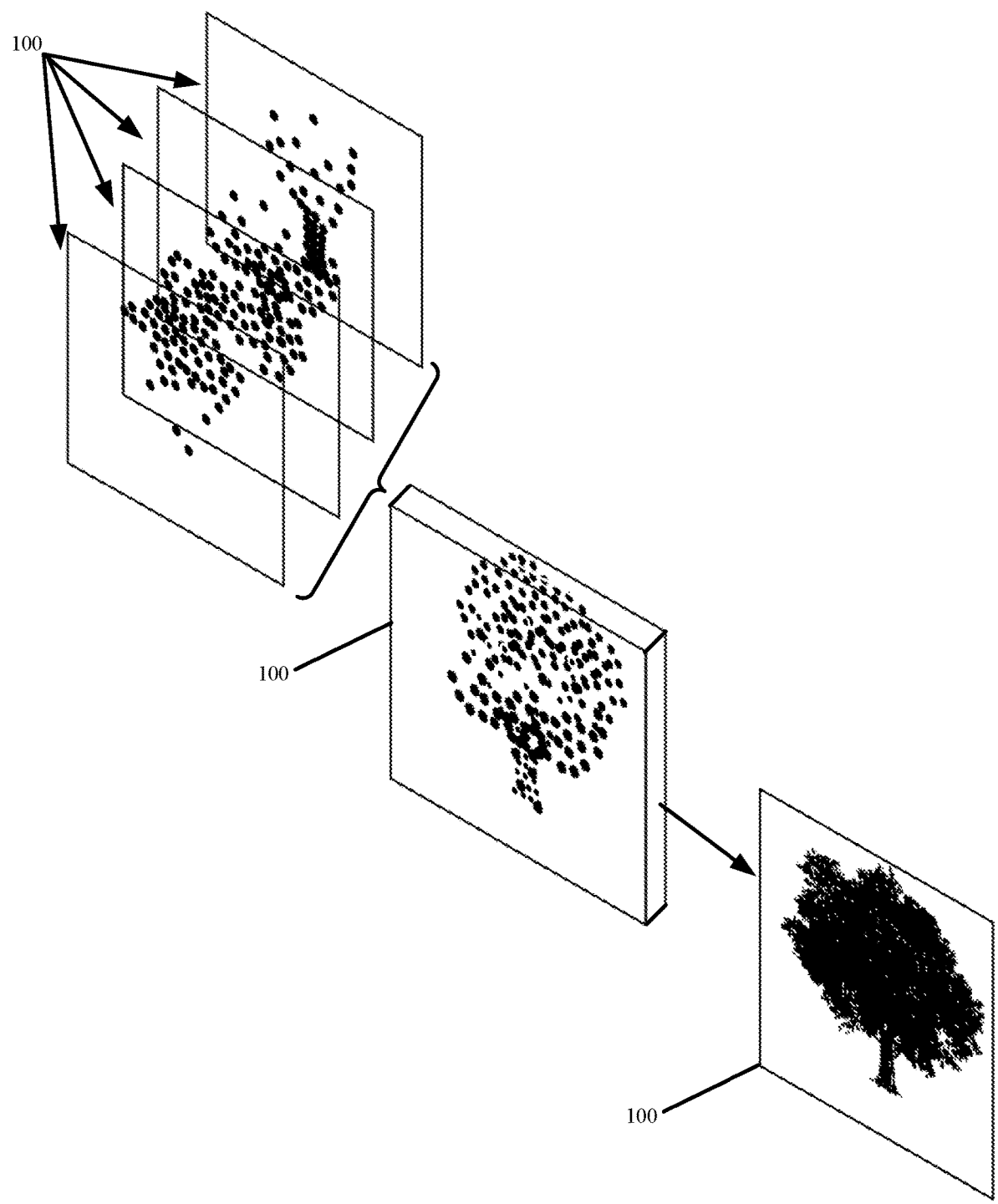
FIG. 1 illustrates an example point cloud with a distributed and disconnected set of data points in accordance with some embodiments presented herein.

FIG. 1 illustrates an example point cloud 100 with a distributed and disconnected set of data points in accordance with some embodiments presented herein. In some embodiments, point cloud 100 may be generated by scanning a scene or other three-dimensional environment using one or more of a 3D or depth-sensing camera, a structured light or patterned light imaging device, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments.

The data points of point cloud 100 differ from pixels of a two-dimensional ("2D") image, because certain regions of point cloud 100 may have no data points, lower densities of data points, and/or higher densities of data points based on varying amounts of visual information that is detected or scanned at those regions. Additionally, the position of the point cloud data points are defined in 3D space using x, y, and z coordinate values. In contrast, pixels of a 2D image are defined in 2D space and have a uniform density or fixed arrangement that is defined by the resolution of the 2D image. In other words, the point cloud data points have a non-uniform placement or positioning, whereas the 2D image have pixel data for each pixel of a defined resolution (e.g., 640×480, 800×600, etc.).

Each point cloud data point is defined with a plurality of elements. The plurality of elements includes a first set of positional elements, and a second set of non-positional or descriptive elements.

The positional elements include coordinates within 3D space. For instance, each point cloud data point includes x-coordinate, y-coordinate, and z-coordinate elements to capture the position of a corresponding physical point from a surface, feature, or object. The positional elements further include a surface normal. The surface normal defines the angle, direction, or orientation that the surface, feature, or object represented by the data point faces or is exposed to. More specifically, the surface normal is a line, ray, or vector that is perpendicular to the scanned surface, feature, or object represented by the data point.

The non-positional elements may include information about the detected characteristics of the surface, feature, or object at a corresponding position in the scanned scene. The characteristics may correspond to a detected color. The color may be represented using red, green, blue ("RGB"), and/or other values. In some embodiments, a data point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the data point.

In some embodiments, the non-positional element store other measured or derived characteristics including the chrominance, hardness, translucence, reflectivity, luminance, metallic characteristics, roughness, specular, diffuse, albedo, index of refraction ("IOR"), and/or other properties from the imaged surface, feature, or object. In some embodiments, the non-positional elements may directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic".

In some embodiments, the characteristics may be related to properties of the device used to generate each of the data points. For instance, the characteristics may include a Tesla strength value to quantify the strength of the magnetic field that was used in detecting and/or imaging the surface, feature, or object represented by a particular point cloud data point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding data point in 3D space.

Each point cloud data point may include an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

The data points of point cloud 100 may be rendered as circles or as squares on a display. For instance, each square-shaped pixel of a display may be used to render one or more data points at a position in the point cloud 3D space that is aligned with or maps to the pixel position.

As a viewer zooms into point cloud 100, the data points become more sparse and certain pixels of the display may no longer be aligned with or map to a data point position in the zoomed view of point cloud 100. To prevent visual discontinuity when the data points positioned within a view frustum are less than the resolution at which the view frustum is rendered or when the distribution of the data points is not aligned with the pixels that display the view frustum, the graphics system dynamically expands meshes of different sizes, shapes, and forms from the data points to conceal or remove the visual discontinuity.

Figure 2:
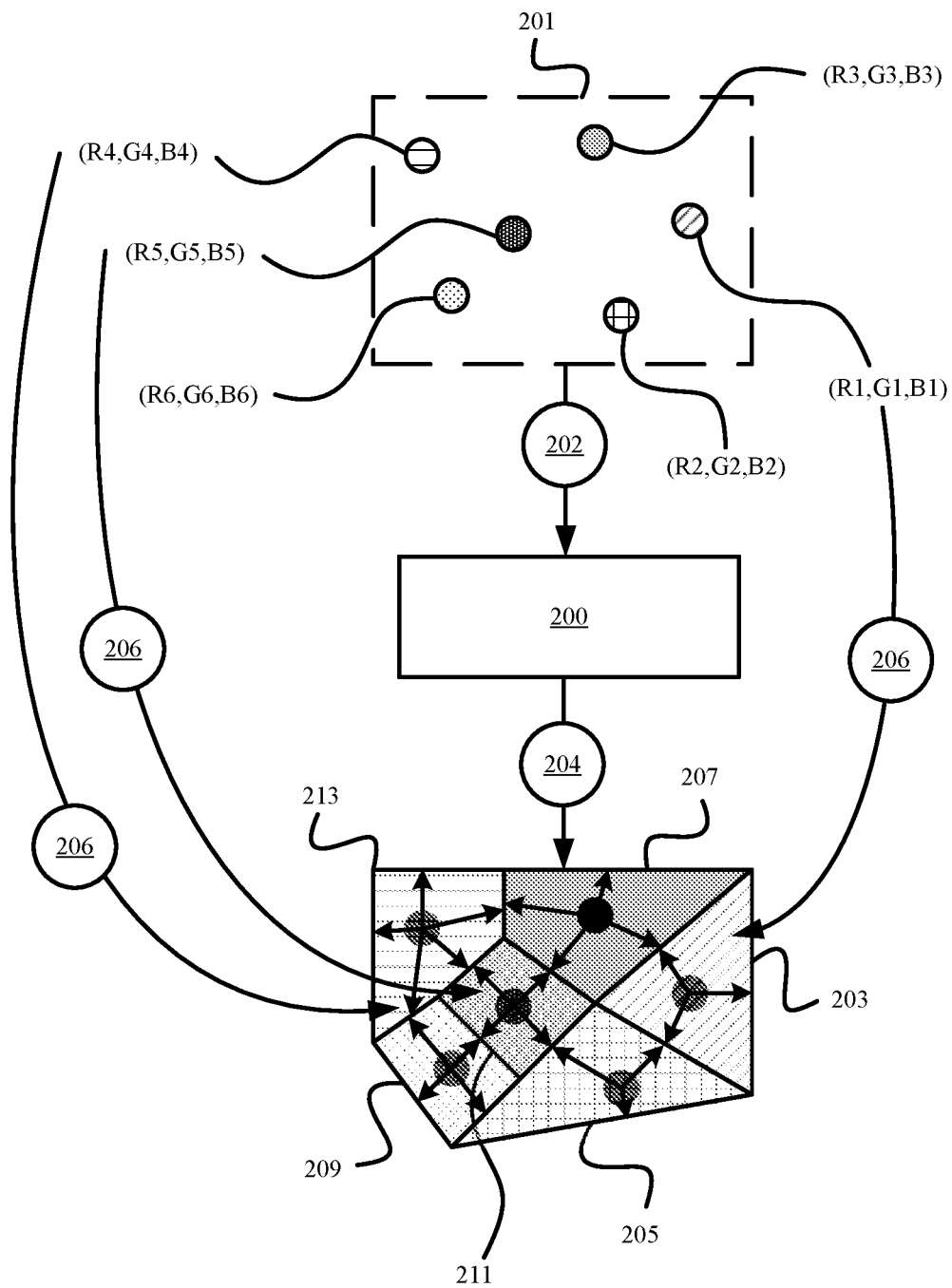
FIG. 2 illustrates an example of dynamically expanding meshes with different sizes, shapes, and/or forms from each of a distributed and disconnected set of data points in order to generate a continuous presentation with connected surfaces in accordance with some embodiments presented herein.

FIG. 2 illustrates an example of dynamically expanding meshes with different sizes, shapes, and/or forms from each of a distributed and disconnected set of data points in order to generate a continuous presentation with connected surfaces in accordance with some embodiments presented herein. Graphics system 200 receives (at 202) distributed and disconnected set of data points 201. Each data point of distributed and disconnected set of data points 201 is defined with different color and/or other descriptive characteristics. Although illustrated as being distributed across two dimensions for simplicity in FIG. 2, data points 201 may be distributed across three dimensions.

Graphics system 200 generates (at 204) meshes that are centered on and that extend from each data point of set of data points 201. Graphics system 200 dynamically determines the mesh size, shape, and/or form for each particular data point based on the positioning, distance, and surface normal of other data points that are immediately adjacent to or that neighbor that particular data point. As shown in FIG. 2, graphics system 200 generates (at 204) three-sided or triangular meshes 203 and 205 of different sizes and forms, four-sided or quadrilateral meshes 207, 209, and 211 of different sizes and forms, and five-sided or pentagonal mesh 213 in order to connect the mesh edges and create a continuous visualization for the surface, object, or region represented by distributed and disconnected set of data points 201.

Graphics system 200 attributes (at 206) the color values and/or other descriptive characteristics of each particular data point 201 to the mesh that is generated (at 204) for and that is centered on that particular data point 201. In other words, the entire surface of a mesh that is extended around a particular data point is defined with the color values and/or other descriptive characteristics of that particular data point.

Figure 3:
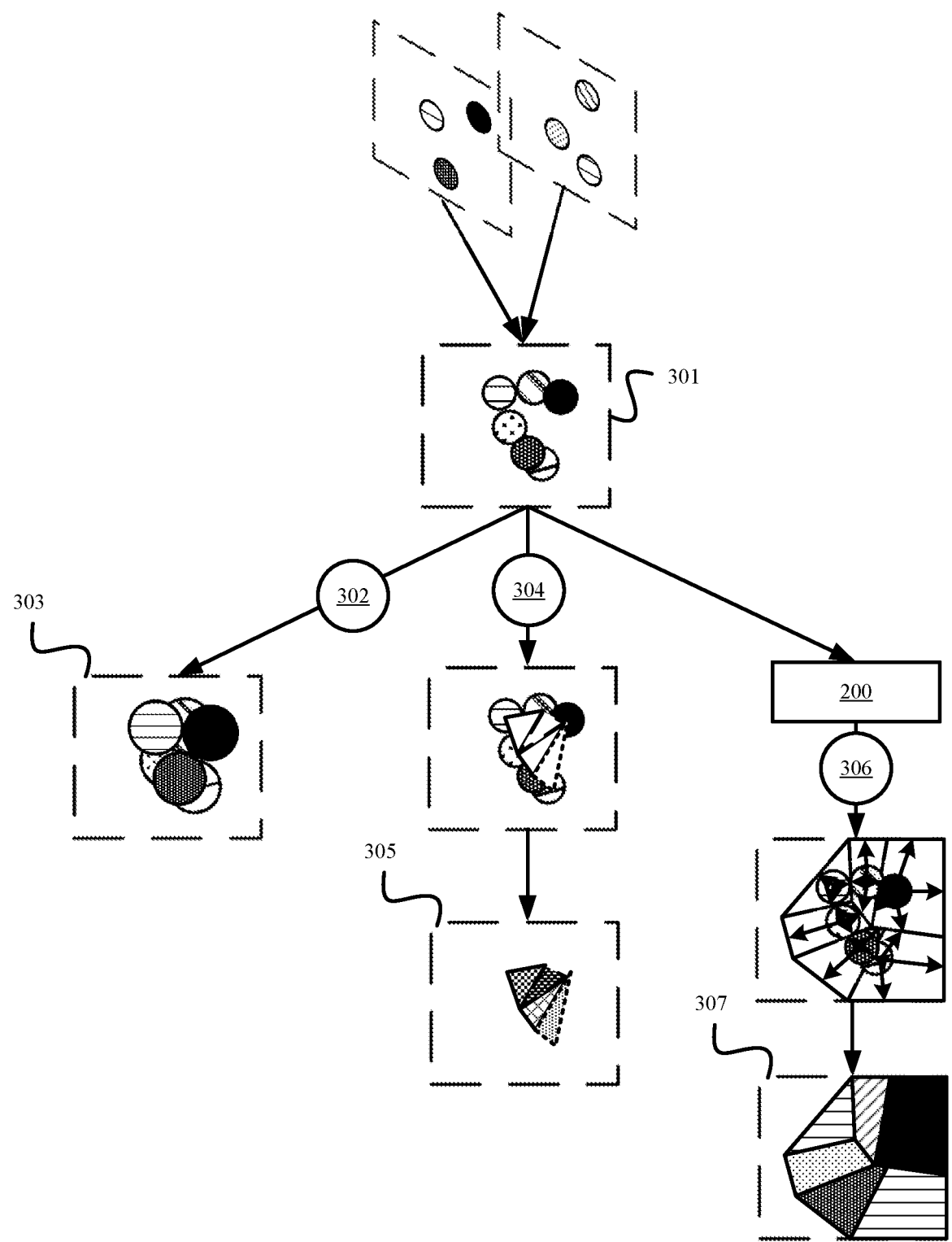
FIG. 3 illustrates different continuous visualizations created for a distributed set of data points by a simplistic splatting technique, a mesh interpolation technique, and the dynamic mesh expansion in accordance with some embodiment presented herein.

Dynamically generating the size, shape, and form of the meshes and centering the meshes on the data points results in an image quality and color accuracy advantage over splatting techniques and mesh interpolation techniques for also remove visual discontinuities when visualizing a distributed set of data points or a point cloud. FIG. 3 illustrates different continuous visualizations created for a distributed set of data points by a simplistic splatting technique, a mesh interpolation technique, and the dynamic mesh expansion implemented by graphics system 200 in accordance with some embodiment presented herein. The different techniques for creating the continuous visualizations are implemented on set of data points 301 that are distributed across two planes or z-coordinates.

The simplistic splatting technique involves equally expanding the size of the data points until gaps or the visual discontinuity are concealed. The simplistic splatting technique produces (at 302) first continuous visualization 303 from set of data points 301. While much of the visual discontinuity between data points 301 is eliminated in first continuous visualization 303, the enlarged data points in the front plane block neighboring enlarged data points in the back plane. As a result, the image quality is degraded as detail provided by the data points in the back plane is lost or obscured by the enlarged data points in the front plane.

The mesh interpolation technique involves defining polygons that use a set of neighboring data points as vertices. For instance, a triangle mesh may be defined between every set of three neighboring data points. The color and/or other descriptive characteristics of the defined polygon is derived from the color and/or other descriptive characteristics of each data point used as one of the polygon's vertices.

The mesh interpolation technique produces (at 304) second continuous visualization 305 from set of data points 301. The color accuracy of second continuous visualization 305 is degraded because the color and/or other descriptive characteristics of each mesh are defined from averaging the color and/or other descriptive characteristics of each data point used as a mesh vertex. In other words, each data point vertex equally contributes to the colors of a mesh even though a first data point vertex of the mesh may be more exposed or facing the view frustum than second and third data point vertices of the mesh. For instance, the first data point vertex may correspond to a data point in the front plane, and the second and third data point vertices may correspond to data points in the back plane. In this case, the first data is more visible in the view frustum, but the colors for the mesh is a blend of colors from all three data points.

The color accuracy is further degraded as edits or adjustments are made to second continuous visualization 305. For instance, an edit or adjustment applied to a region that is centered on a particular data point is not applied only to the descriptive characteristics of that particular data point. Instead, the edit or adjustment is applied to each mesh that uses the particular data point for one of the mesh's vertices, and is also applied to the descriptive characteristics of each mesh. Each edit is now applied and used to adjust the color values of one or more meshes, wherein the color values of each mesh are derived from the color values of multiple different data points that may be positioned outside the region where the edit is applied.

Graphics system 200 generates (at 306) third continuous visualization 307 according to the dynamic mesh expansion technique of the described embodiments. Third continuous visualization 307 preserves and improves upon the image quality by ensuring that a mesh expanded from a data point in the front plane does not obscure or block a mesh expanded from a data point in the back plane. Instead, the meshes are expanded to connect to one another and create a continuous surface between data points in different planes or z-depths.

Moreover, each mesh that is centered on and expanded from a particular data point in third continuous visualization 307 inherits the descriptive characteristics of that particular data point only. Consequently, the same descriptive characteristics of a particular point cloud are presented at and around the position of the particular data point, whereas the mesh interpolation technique presents the different averaged descriptive characteristics around a particular data point for every mesh that uses that particular data point as a vertex. In other words, if the particular data point is a vertex for four different meshes, then four different color values are presented immediately around the particular point data point in second continuous visualization 305 distorting the color accuracy of second continuous visualization 305 relative to third continuous visualization 307 when zooming in on the particular point data or the surrounding region. Also, edits applied over an expanded mesh in third continuous visualization 307 affect the descriptiveness characteristics of a single data point rather than descriptive characteristics derived from averaging descriptive characteristics of neighboring data points at positions outside the region where the edits are applied.

Figure 4:
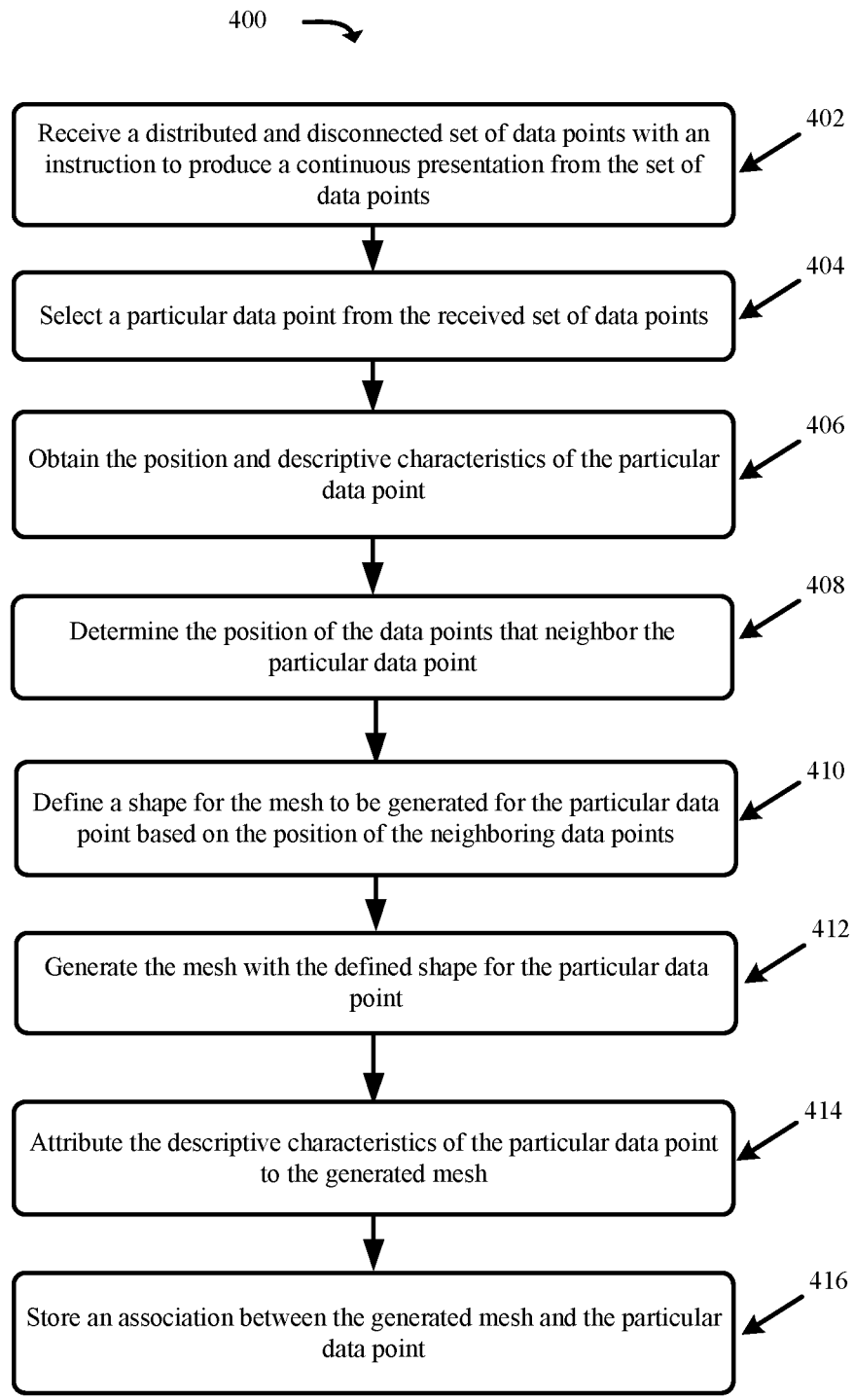
FIG. 4 presents a process for dynamically generating meshes that are centered on data points of a point cloud in accordance with some embodiments presented herein.

FIG. 4 presents a process 400 for dynamically generating meshes that are centered on data points of a point cloud in accordance with some embodiments presented herein. Process 400 is implemented by graphics system 200. Graphics system 200 includes one or more devices with hardware processors (e.g., central processing units, graphics processing units, accelerated processing units, etc.), memory, storage, and/or other compute resources for the conversion, rendering, editing, and/or other processing of point clouds or disconnected sets of data points that are distributed within a 2D or 3D space.

Process 400 includes receiving (at 402) a distributed and disconnected set of data points with an instruction to produce a continuous presentation from the distributed and disconnected set of data points. In some embodiments, receiving (at 402) the distributed and disconnected set of data points includes receiving a 2D, point cloud, or other 3D file format that is encoded with the distributed and disconnected set of data points, wherein each is defined with positional and non-positional elements. In some other embodiments, the distributed and disconnected set of data points are transmitted over a data network to graphics system 200, or are generated and output to graphics system 200 from a scanner that generates the data point representation or model of a scene. The instruction to produce the continuous presentation may be generated in response to the density of data points being less than a threshold density, setting the view frustum to a part of the image or scene represented by the set of data points where there are gaps of a noticeable size in between the data points, zooming into the image or scene such that the resolution of the display is greater than the density of the data points, a user preference, and/or a default preference of graphics system 200.

Process 400 includes selecting (at 404) a particular data point from the received (at 402) set of data points. Graphics system selects (at 404) a data point that has yet to be expanded and/or converted into a mesh.

In some embodiments, the selection (at 404) of the particular data point may be contingent on the distance between the particular data point and its neighboring data points. For instance, if the distance between the particular data point and its neighboring data points is less than a threshold distance at which a gap or discontinuity becomes visible in the rendering or visualization of the set of data points, then graphics system 200 skips over the particular data point and renders the particular data point as a point without converting or expanding the particular data point into a mesh. However, if the distance between the particular data point and its neighboring data points is greater than the threshold distance at which a gap or discontinuity becomes visible in the rendering or visualization of the set of data points, then the graphics system selects to expand the particular data points into a mesh.

Process 400 includes obtaining (at 406) the position and descriptive characteristics of the particular data point. Obtaining (at 406) the position of the particular data point includes reading the positional elements of the particular data points in order to extract the spatial coordinates of the particular data point and the surface normal of the particular data point. Similarly, obtaining (at 406) the descriptive characteristics includes reading the non-positional elements of the particular data point, and extracting the color values and/or other descriptive characteristics of the particular data point from the non-positional elements.

Figure 5:
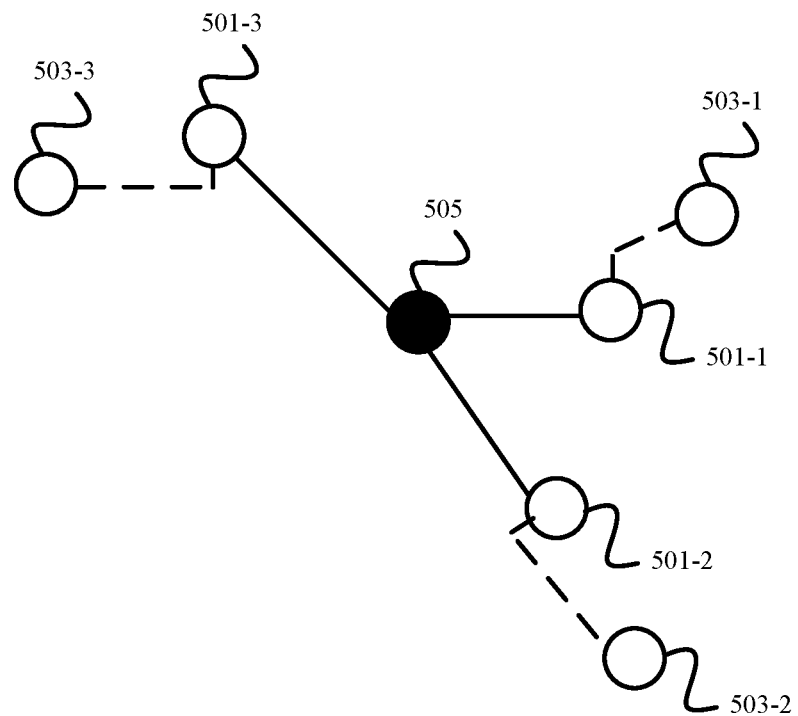
FIG. 5 illustrates an example of neighboring data points and non-neighboring data points for a selected data point.

Process 400 includes determining (at 408) the position of the data points that neighbor the particular data point. A neighboring data point is a data point that has no other data points between itself and the particular data point, or that has no other data point within a threshold distance from itself and the particular data point. FIG. 5 illustrates an example of neighboring data points 501-1, 501-2, and 501-3 and non-neighboring data points 503-1, 503-2, and 503-3 for selected data point 505.

Process 400 includes defining (at 410) a shape for the mesh to be generated for the particular data point based on the position of the neighboring data points. For instance, graphics system 200 defines (at 410) a five-sided polygon (e.g., a pentagon) as the mesh to extend from the particular data point in response to the particular data point having five neighboring data points, and defines (at 410) a three-sided polygon (e.g., a triangle) as the mesh to extend from the particular data point in response to the particular data point having three neighboring data points.

Process 400 includes generating (at 412) the mesh with the defined (at 410) shape for the particular data point. Generating (at 412) the mesh includes centering the mesh on the particular data point (e.g., the center of the mesh being located at the positional coordinates of the particular data point), and extending each side of the defined (at 410) polygonal shape half the distance towards a neighboring data point up to a maximum distance from the particular data point. The extension halfway towards a neighboring data point ensures that the mesh for the particular data point and the mesh for the neighboring data point are not disproportionately sized in each other's direction. The surface normal of the particular data point and the neighboring data point may be used to determine the angle or direction at which the mesh is extended and/or the surface normal of that side of the mesh. The size, shape, and form of the generated (at 412) is therefore customized based on the positioning and surface normals of the neighboring data points.

Figure 6:
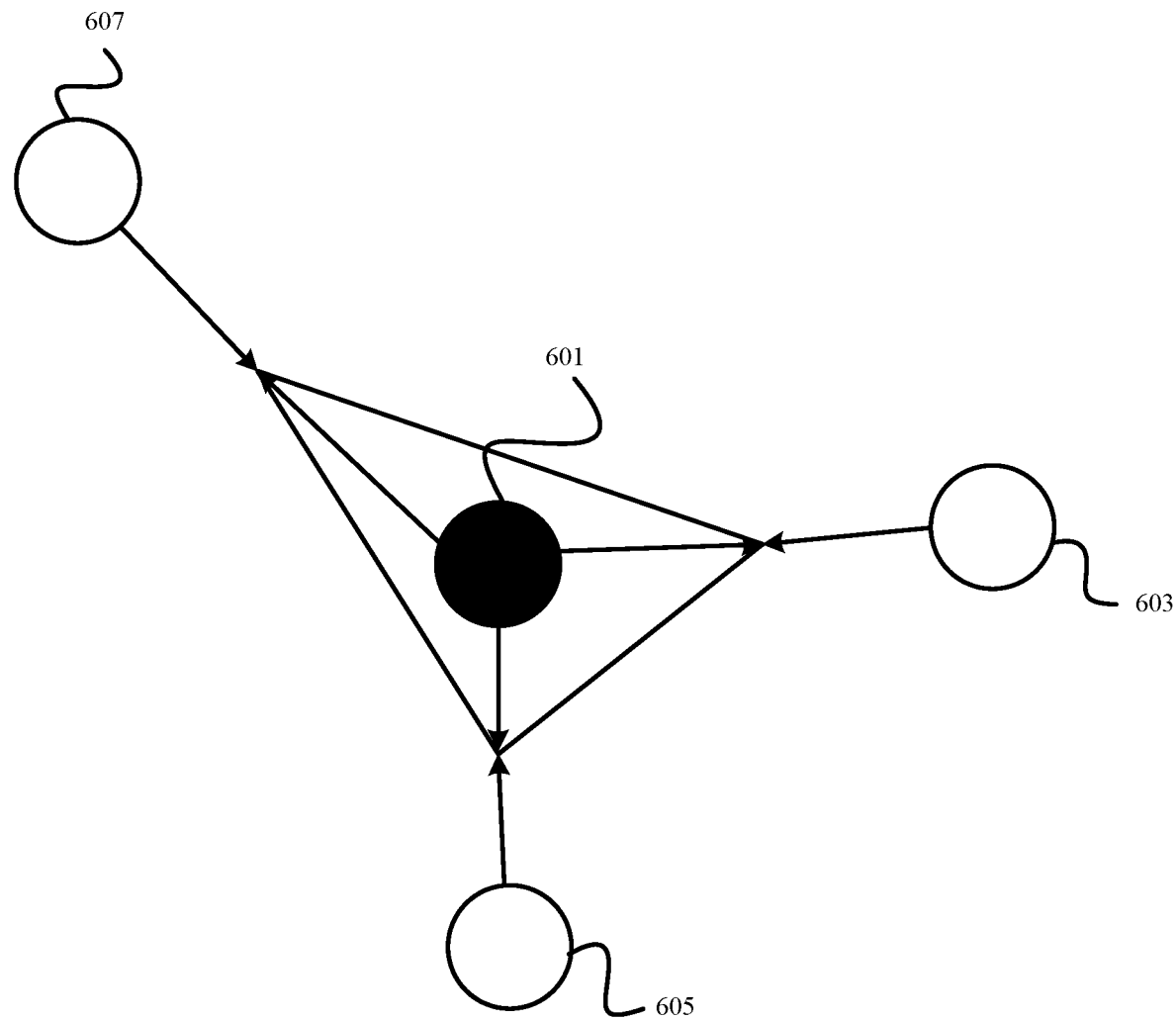
FIG. 6 illustrates an example of extending different sides of a polygonal shape for a particular data point different lengths or distances from the particular data point based on the different distance of each neighboring data point.

FIG. 6 illustrates an example of extending different sides of the defined (at 410) polygonal shape for a particular data point different lengths or distances from the particular data point based on the different distance of each neighboring data point. As shown in FIG. 6, particular data point 505 has three directly neighboring data points 603, 605, and 607. Accordingly, graphics system 200 defines a triangular mesh to extend outward from particular data point 601. Graphics system 200 extends a first side of the triangular mesh a first length in a first direction that is halfway to neighboring data point 603, extends a second side of the triangular mesh a second length in a second direction that is halfway to neighboring data point 605, and extends a third side of the triangular mesh a third length in a third direction that is halfway to neighboring data point 607.

Figure 7:
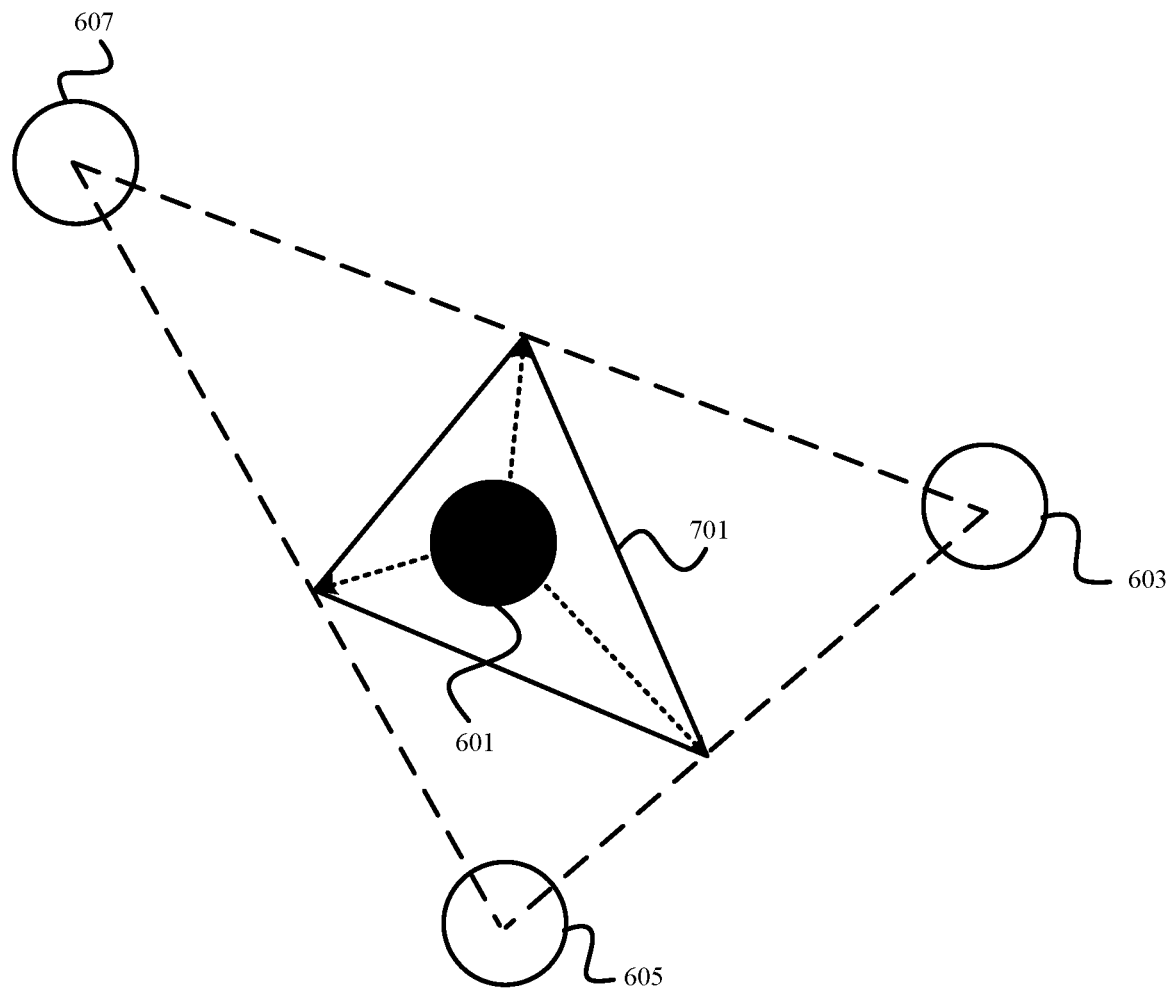
FIG. 7 illustrates an alternative example for dynamically generating the size, shape, and form of a mesh for a particular data point based on the positions of detected neighboring data points in accordance with some embodiments presented herein.

In some embodiments, graphics system 200 generates (at 412) the mesh for the particular data point via a different extension of the mesh sides. FIG. 7 illustrates an alternative example for dynamically generating the size, shape, and form of a mesh for a particular data point based on the positions of detected neighboring data points in accordance with some embodiments presented herein.

In FIG. 7, graphics system 200 extends each side of mesh 701 that is created for particular data point 601 to the halfway point that is between each pair of neighboring data.

In any case, graphics system 200 generates (at 412) each side or edge of the mesh to connect to a side or edge of a mesh that is generated for a neighboring data point. Consequently, graphics system 200 constructs a continuous surface across the space represented by the set of data points via the connected meshes.

Process 400 includes attributing (at 414) the descriptive characteristics of the particular data point to the generated (at 412) mesh. In other words, the non-positional elements of the generated (at 412) mesh match the non-positional values of the particular data point so that generated (at 412) mesh has the same colors and other descriptive characteristics as the particular data point that the mesh is centered on.

Process 400 includes storing (at 416) an association between the generated (at 412) mesh and the particular data point so that the generated (at 412) may be presented in place of the particular data point when generating the visualization for the received (at 402) set of data points with continuous surfaces and/or when the inclusion of the particular data point in the visualization results in a gap or other noticeable visual discontinuity.

Process 400 repeats in order to generate a mesh for each data point of the received (at 402) set of data points. The generated meshes may have different sizes, shapes, and/or forms depending on the number of neighboring data points and/or the positioning of the neighboring data points relative to the data points that the meshes are centered on. In any case, the meshes are connected to one another and collectively create a continuous surface over the region or space spanned by the distributed and disconnected set of data points.

In some embodiments, graphics system 200 generates the meshes for the entire set of data points at one time and stores the association between the meshes and the data points in a file so that the meshes do not have to be regenerated each time the set of data points is accessed, rendered, and/or displayed. The mesh data may be stored in the same file or in a different file as the point cloud data points.

Figure 8:
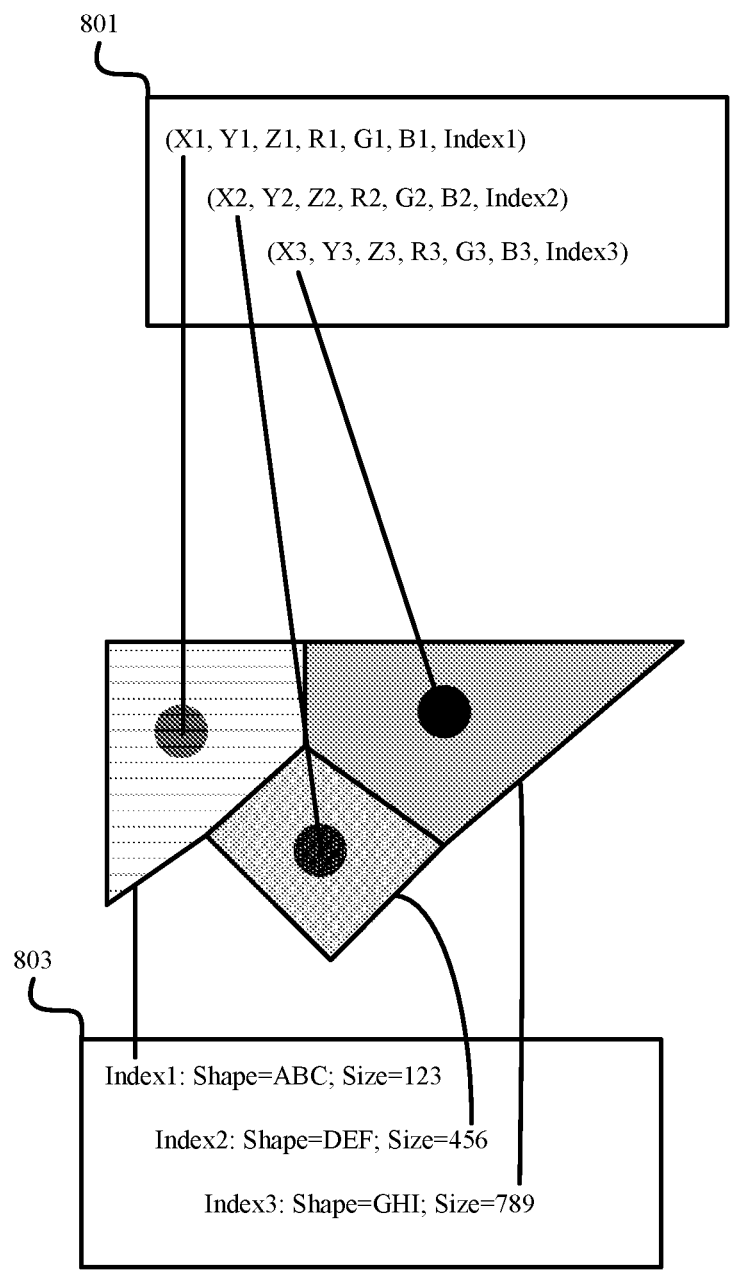
FIG. 8 illustrates example associations between generated meshes and point cloud data points.

FIG. 8 illustrates example associations between generated meshes and point cloud data points. In FIG. 8, the data point information (e.g., positional and non-positional elements) are stored in first file 801, and the mesh data is stored in second file 803. Graphics system 200 creates an association between the two data sets by adding an index or identifier to each data point. The index or identifier may include a value that uniquely identifies a data point in first file 801 and a mesh generated for that data point in second file 803. Accordingly, each mesh in second file 803 is associated with one index or identifier that is added as a non-positional element of a data point.

The index or identifier is used to determine the center of a mesh and the descriptive characteristics of the mesh by referencing the positional and the non-positional elements of an associated data point in first file 801. Each mesh in second file 803 is defined with size and shape attributes. For instance, the size and shape attributes define the number of sides and the distance and direction that each side of the mesh extends from the mesh center.

Graphics system 200 may load in the point cloud data points and the associated mesh data to switch between visualizations that are generated from just the point cloud data points, the meshes associated with the data points, and/or a combination of the two. For instance, graphics system 200 renders the point cloud data points when viewing the rendered scene from a first position or distance at which none of the gaps or separation between the data points is visible, renders a combination of meshes and data points when some of the gaps or separation between the data points become visible, and renders the meshes instead of the point cloud data points when the overall or average density of the data points falling within a selected view frustum is lower than the screen resolution at which the view frustum is displayed.

In some embodiments, graphics system 200 limits the mesh size to preserve image quality and color accuracy. For instance, when two neighboring data points are separated by more than a specified distance, rather than extend two meshes from each data point to cover that distance and then have an abrupt transition from the color and/or other descriptive characteristics of one data point or mesh to the next, the graphics system creates new interpolated meshes to smooth the transition between the distant neighboring data points.

Figure 9:
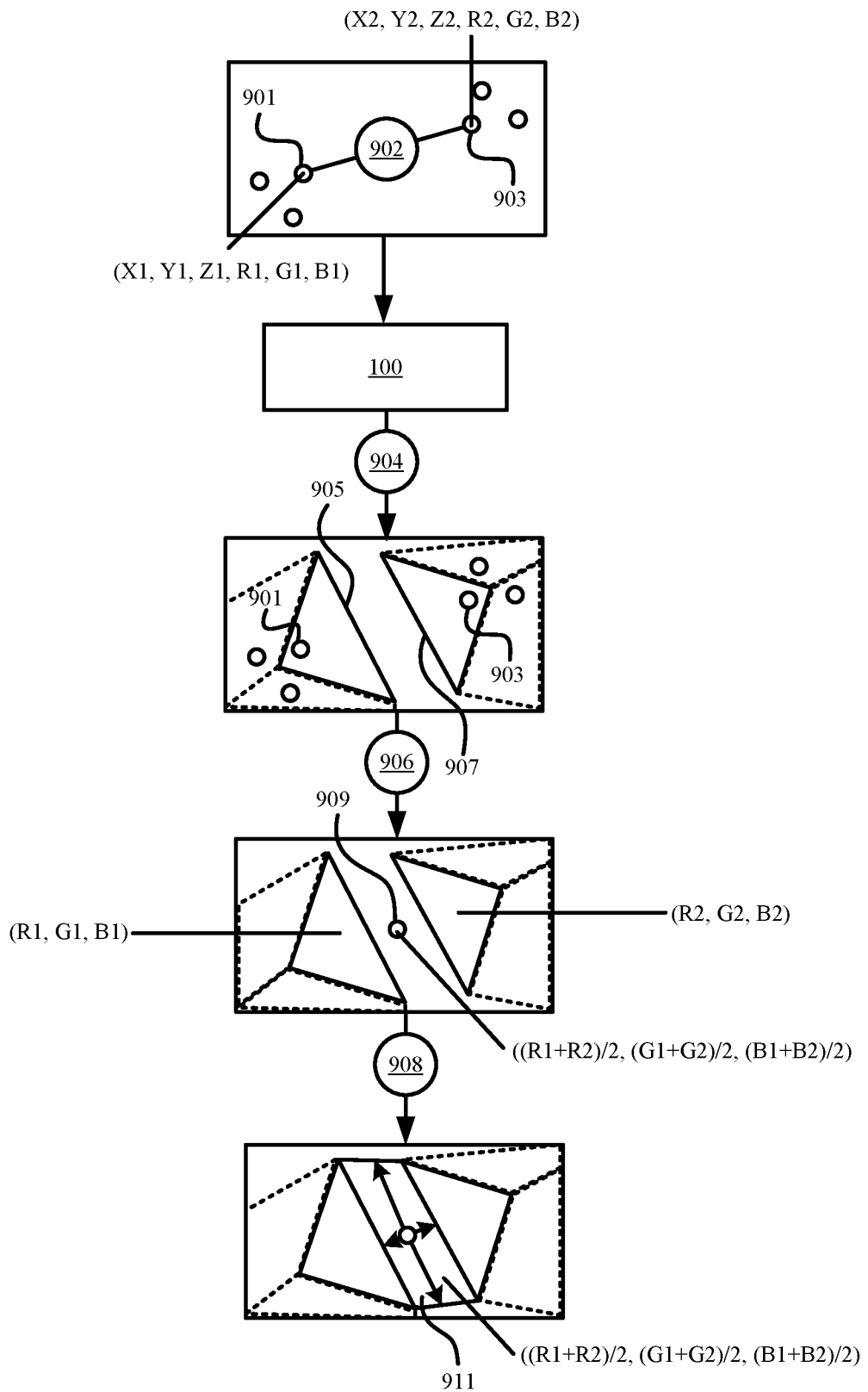
FIG. 9 illustrates an example of generating interpolated meshes for distant neighboring data points in accordance with some embodiments presented herein.

FIG. 9 illustrates an example of generating interpolated meshes for distant neighboring data points in accordance with some embodiments presented herein. Graphics system 200 determines (at 902) that the distance between neighboring data points 901 and 903 exceeds a maximum distance for directly connecting meshes that are generated for each data point 901 and 903.

Accordingly, graphics system 200 generates (at 904) first mesh 905 that is centered on first data point 901 of the distant neighboring data points, and second mesh 907 that is centered on second data point 903 of the distant neighboring data points. Generating (at 904) first and second meshes 905 and 907 includes extending one side of first mesh 905 and one side of second mesh 907 towards each other until each extended side is of a maximum length.

A gap remains between first mesh 905 and second mesh 907 resulting in a visual discontinuity if the view frustum zooms in close enough to that region of the visualization. Graphics system detects the gap (e.g., that the sides of first mesh 905 and second mesh 907 do not connect), and generates (at 906) new data point 909 at the center of the gap. The descriptive characteristics or non-positional elements of new data point 909 are derived from those of distant neighboring data points 901 and 903. In some embodiments, the descriptive characteristics of new data point 909 are an average of the descriptive characteristics of distant neighboring data points 901 and 903. In some embodiments, the descriptive characteristics of new data point 909 are interpolated based on a distance between new data point 909 and each data point of distant neighboring data points 901 and 903. For instance, if new data point 909 is 50% closer to first data point 901 than second data point 903, then graphics system 200 defines the descriptive characteristics of new data point 909 based on a 75% contribution or weighting of the descriptive characteristics of first distant neighboring data point 901 and a 25% contribution or weighting of the descriptive characteristics of second distant neighboring data point 903.

Graphics system 200 generates (at 908) interpolated mesh 911 that is centered on new data point 909, and that extends outward from new data point 909 to connect to first mesh 905 and second mesh 907 on either side. Graphics system 200 attributes the derived descriptive characteristics of new data point 909 to interpolated mesh 911. Consequently, the coloring of interpolated mesh 911 is a blending of the coloring from first mesh 905 and second mesh 907 such that the visual transition from first mesh 905 to second mesh 907 is more gradual.

Dynamically generating the meshes that are centered on the point cloud data points and that have the custom sizes, shapes, and/or forms based on the positioning of neighboring data points may be a computationally expensive operation. Depending on the compute resources of the graphics system, generating the continuous presentation with these dynamically generated meshes could take several seconds or minutes.

A user may prefer a faster visualization. Accordingly, in some embodiments, graphics system 200 produces a continuous presentation of the point cloud for just the current view frustum. In some such embodiments, graphics system 200 generates meshes for the data points that are within the view frustum, and simplifies the mesh generation by connecting the meshes across the two viewable dimensions of the view frustum. The user is then presented with a continuous presentation for the desired part of the point cloud, and graphics system 200 may use the available resources to dynamically generate the meshes for other parts of the point cloud and/or to more accurately connect the meshes across three dimensions should the user change the view frustum to view the meshes from different angles or perspectives.

Figure 10:
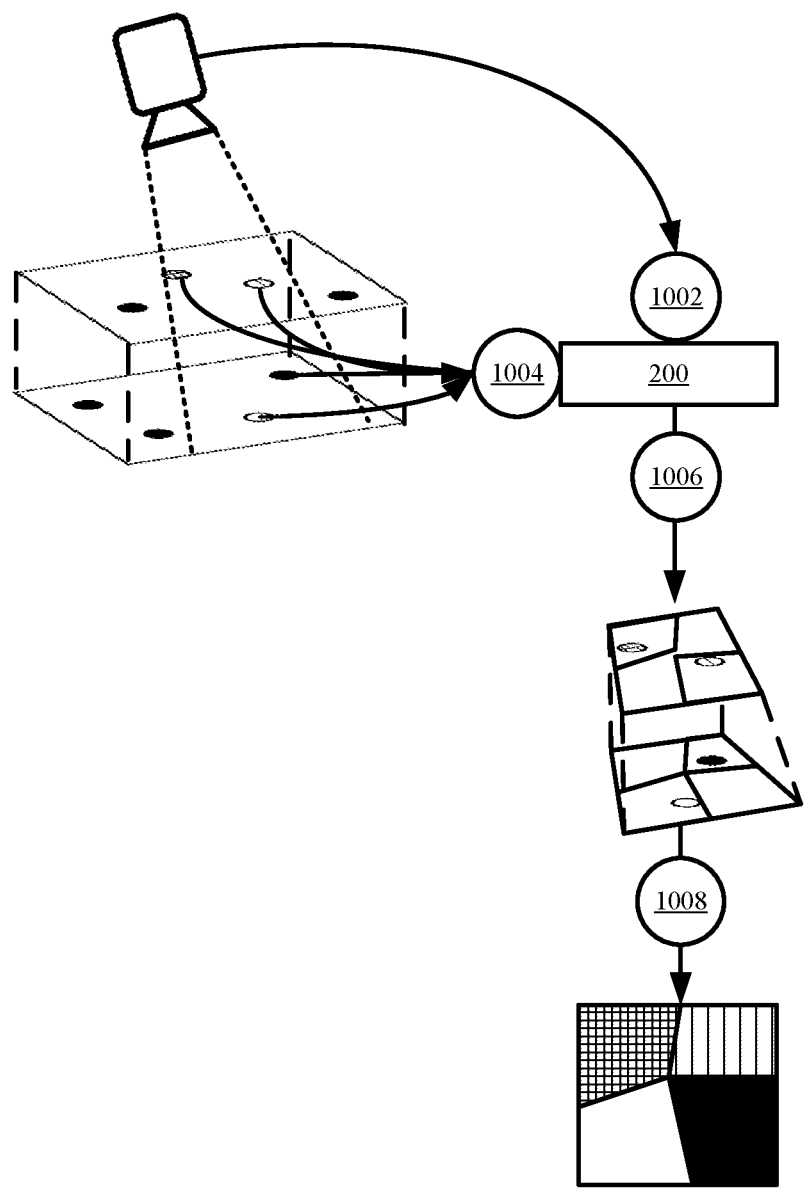
FIG. 10 illustrates an example of producing the continuous point cloud presentation for the current view frustum in accordance with some embodiments presented herein.

FIG. 10 illustrates an example of producing the continuous point cloud presentation for the current view frustum in accordance with some embodiments presented herein. The view frustum defines what part of the point cloud is to be rendered and/or displayed, and the perspective at which that part of the point cloud is to rendered and/or displayed. The user may set the view frustum by moving a virtual camera or by performing other movements or rotations within the point cloud.

Graphics system 200 tracks (at 1002) the view frustum. Tracking (at 1002) the view frustum includes determining a part of the point cloud that is selected for visualization, and the orientation at which to render the visualization.

Graphics system 200 selects (at 1004) the set of data points that are within the view frustum. As shown in FIG. 10, the view frustum encompasses the data points that are about a center of two planes of the point cloud.

Graphics system 200 generates (at 1006) meshes that are centered on each data point in the set of data points. Generating (at 1006) the meshes includes extending the meshes horizontally and vertically about each plane but not between planes according to the positioning of the neighboring data points in the same plane and other planes. Specifically, graphics system 200 extends the meshes in the front plane so as to not obscure the meshes in the back plane for the data points in the back plane that are visible in the view frustum. The meshes do not create a continuous surface in each plane. However, when the meshes from each plane are combined to create the 2D visualization of the view frustum, the combination of the meshes creates a continuous surface across the different planes represented in the rendered view frustum.

Graphics system 200 maps (at 1008) the descriptive characteristics of each data point to the mesh that is generated for that data point. Consequently, the gaps between the data points within the view frustum are concealed and the colors and descriptive characteristics of the data points are enlarged in the rendered visualization to better expose the detail from the represented scene.

If the user rotates the view frustum for a side perspective of the two planes rather than the current top perspective, then graphics system 200 may reproduce the continuous presentation for adjusted view frustum. Alternatively, graphics system 200 may generate the fully connected meshes for all data points in all planes of the point cloud so that the visualization for the side perspective may be presented without regenerating the meshes.

Figure 11:
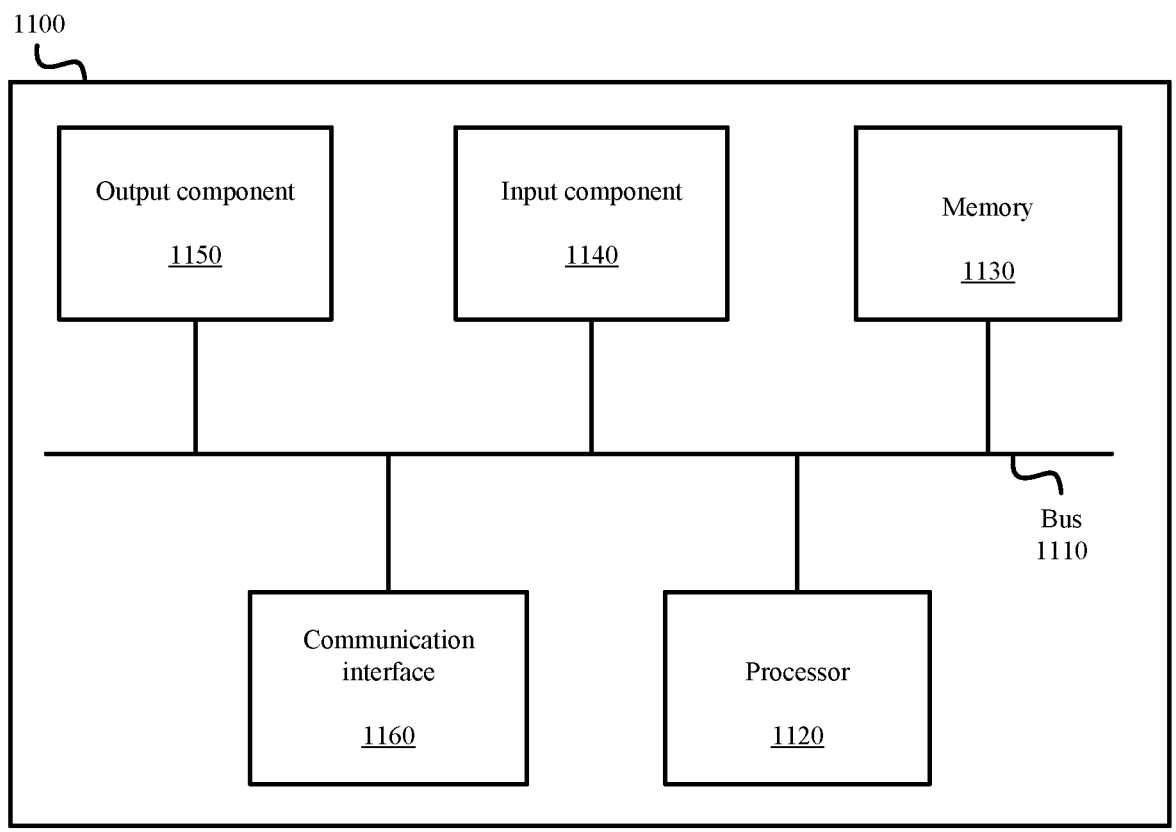
FIG. 11 illustrates example components of one or more devices, according to one or more embodiments described herein.

FIG. 11 is a diagram of example components of device 1100. Device 1100 may be used to implement one or more of the devices or systems described above (e.g., graphics system 200, scanners, imaging devices, etc.). Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more LEDs, etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a plurality of data points that are disconnected from one another, that are distributed across a space, and that collectively produce a discontinuous visualization of a scene, wherein each data point of the plurality of data points comprises a set of positional elements that define a position of that data point in the space, and a set of non-positional elements that define color characteristics of that data point;
   expanding a polygonal mesh from the position of each data point of the plurality of data points, wherein each side or vertex of the polygonal mesh that is expanded from the position of a particular data point connects to a side or a vertex of another polygonal mesh that is expanded from the position of each data point of a set of data points that neighbors the particular data point, wherein each side or vertex of the polygonal mesh that is expanded from the position of the particular data point does not contact any of the set of data points that neighbors the particular data point, and wherein the polygonal mesh of the particular data point spans a larger area or volume of the space than the particular data point; and
   producing a continuous visualization of the scene from rendering the polygonal mesh that is expanded from the position of each data point of the plurality of data points instead of rendering the plurality of data points.

2. The method of claim 1 further comprising:
   centering each polygonal mesh on the position of a different data point from the plurality of data points.

3. The method of claim 1 further comprising:
   determining the position of each data point from the set of data points that neighbors the particular data point; and
   defining a shape and size of the polygonal mesh that is expanded from the position of the particular data point based on the position of each data point from the set of data points.

4. The method of claim 1 further comprising:
   defining a color of the polygonal mesh that is expanded from the position of the particular data point based on the color characteristics of the particular data point.

5. The method of claim 4, wherein defining the color comprises:
   mapping color values from the set of non-positional elements of the particular data point across a surface of the polygonal mesh that is expanded from the position of the particular data point without a color contribution from any data point of the set of data points that neighbors the particular data point.

6. The method of claim 1, wherein expanding the polygonal mesh comprises:
   generating a first mesh with a first size and a first shape for a first data point of the plurality of data points based on a first positioning of a first set of data points that neighbor the first data point; and
   generating a second mesh with a second size and a second shape for a second data point of the plurality of data points based on a second positioning of a second set of data points that neighbor the second data point.

7. The method of claim 6, wherein expanding the polygonal mesh further comprises:
   centering the first mesh at the position of the first data point with edges and vertices of the first mesh extending towards but not contacting any data point of the first set of data points that neighbor the first data point; and
   centering the second mesh at the position of the second data point with edges and vertices of the second mesh extending towards but not contacting any data point of the second set of data points that neighbor the second data point.

8. The method of claim 6, wherein producing the continuous visualization comprises:
   rendering the first mesh using the color characteristics of the first data point; and
   rendering the second mesh using the color characteristics of the second data point.

9. The method of claim 1, wherein producing the continuous visualization comprises:
   coloring each polygonal mesh based on the color characteristics of a different single data point from the plurality of data points.

10. The method of claim 1, wherein expanding the polygonal mesh comprises:
    selecting the particular data point from the plurality of data points;
    determining the position of each data point from the set of data points that neighbors the particular data point; and
    extending each side of the polygonal mesh that is expanded from the position of the particular data point towards a different neighboring data point from the set of data points without contacting that different neighboring data point based on the position of the different neighboring data point to the position of the particular data point.

11. The method of claim 10, wherein extending each side of the polygonal mesh comprises:
    extending a side of the polygonal mesh that is expanded from the position of the particular data point half of a distance separating the particular data point from one or more neighboring data points from the set of data points.

12. The method of claim 10, wherein extending each side of the polygonal mesh comprises:
    extending each side of the polygonal mesh that is expanded from the particular data point a different distance between the position of the particular data point and the position of each neighboring data point from the set of data points.

13. The method of claim 1 further comprising:
    storing each polygonal mesh separate from the plurality of data points; and
    associating a unique index to a non-positional element of the particular data point and to the polygonal mesh that is expanded from the position of the particular data point.

14. The method of claim 1 further comprising:
    tracking one or more of a position and an orientation of a view frustum;
    generating a visualization of the scene from rendering the plurality of data points in response to the view frustum being at a first position or orientation relative to the plurality of data points; and
    wherein producing the continuous visualization of the scene comprises rendering the polygonal mesh that is expanded from the position of each data point of the plurality of data points in response to the view frustum being at a second position or orientation relative to the plurality of data points.

15. The method of claim 1 further comprising:
receiving a first request to render the scene from a first position;
determining that a separation between the plurality of data points when rendering the scene from the first position is less than a threshold distance;
generating a first visualization of the scene from the first position by rendering the plurality of data points in response to the separation being less than the threshold distance;
receiving a second request to render the scene from a closer second position;
determining that the separation between the plurality of data points when rendering the scene from the second position is more than the threshold distance; and
wherein producing the continuous visualization of the scene comprises rendering the polygonal mesh that is expanded from the position of each data point of the plurality of data points in response to the separation being more than the threshold distance.

16. A graphics system comprising:
one or more hardware processors configured to:
receive a plurality of data points that are disconnected from one another, that are distributed across a space, and that collectively produce a discontinuous visualization of a scene, wherein each data point of the plurality of data points comprises a set of positional elements that define a position of that data point in the space, and a set of non-positional elements that define color characteristics of that data point;
expand a polygonal mesh from the position of each particular data point of the plurality of data points, wherein each side or vertex of the polygonal mesh that is expanded from the position of a particular data point connects to a side or a vertex of another polygonal mesh that is expanded from the position of each data point of a set of data points that neighbors the particular data point, wherein each side or vertex of the polygonal mesh that is expanded from the position of the particular data point does not contact any of the set of data points that neighbors the particular data point, and wherein the polygonal mesh of the particular data point spans a larger area or volume of the space than the particular data point; and
produce a continuous visualization of the scene from rendering the polygonal mesh that is expanded from the position of each data point of the plurality of data points instead of rendering the plurality of data points.

17. The graphics system of claim 16, wherein the one or more hardware processors are further configured to:
center each polygonal mesh on the position of a different data point from the plurality of data points.

18. The graphics system of claim 16, wherein the one or more hardware processors are further configured to:
define a color of the polygonal mesh that is expanded from the position of the particular data point based on the color characteristics of the particular data point.

19. The graphics system of claim 18, wherein defining the color comprises:
mapping color values from the set of non-positional elements of the particular data point across a surface of the polygonal mesh that is expanded from the position of the particular data point without a color contribution from any data point of the set of data points that neighbors the particular data point.

20. A non-transitory computer-readable medium storing program instructions that, when executed by one or more hardware processors of a graphics system, cause the graphics system to perform operations comprising:
receive a plurality of data points that are disconnected from one another, that are distributed across a space, and that collectively produce a discontinuous visualization of a scene, wherein each data point of the plurality of data points comprises a set of positional elements that define a position of that data point in the space, and a set of non-positional elements that define color characteristics of that data point;
expand a polygonal mesh from the position of each particular data point of the plurality of data points, wherein each side or vertex of the polygonal mesh that is expanded from the position of a particular data point connects to a side or a vertex of another polygonal mesh that is expanded from the position of each data point of a set of data points that neighbors the particular data point, wherein each side or vertex of the polygonal mesh that is expanded from the position of the particular data point does not contact any of the set of data points that neighbors the particular data point, and wherein the polygonal mesh of the particular data point spans a larger area or volume of the space than the particular data point; and
produce a continuous visualization of the scene from rendering the polygonal mesh that is expanded from the position of each data point of the plurality of data points instead of rendering the plurality of data points.

* * * * *